(12) United States Patent
Kobayashi

(10) Patent No.: US 6,549,494 B2
(45) Date of Patent: Apr. 15, 2003

(54) INFORMATION RECORDING MEDIUM AND RECORDING/REPRODUCING APPARATUS COMPATIBLE WITH COPY PROTECTION

(75) Inventor: Tadashi Kobayashi, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/998,310

(22) Filed: Dec. 3, 2001

(65) Prior Publication Data

US 2002/0060963 A1 May 23, 2002

Related U.S. Application Data

(63) Continuation of application No. PCT/JP00/02153, filed on Apr. 3, 2000.

(51) Int. Cl.[7] ................................. G11B 7/00
(52) U.S. Cl. .................. 369/47.1; 369/53.1; 369/275.1
(58) Field of Search .................. 369/47.1, 47.55, 369/53.1, 59.1, 275.1, 275.2, 275.4

(56) References Cited

U.S. PATENT DOCUMENTS 5,379,433 A * 1/1995 Yamagishi .................. 360/60

FOREIGN PATENT DOCUMENTS

| EP | 0 689 200 A1 | 12/1995 |
|----|--------------|---------|
| JP | 4-82039 | 3/1992 |
| JP | 6-150317 | 5/1994 |
| JP | 8-31080 | 2/1996 |
| JP | 9-274774 | 10/1997 |
| JP | 10-105974 | 4/1998 |
| JP | 10-105975 | 4/1998 |
| JP | 11-86436 | 3/1999 |
| JP | 11-355711 | 12/1999 |

* cited by examiner

*Primary Examiner*—Muhammad Edun
(74) *Attorney, Agent, or Firm*—Oblon, Spivak, McClelland, Maier & Neustadt, P.C.

(57) ABSTRACT

Identification information B is recorded in a specific area for a disk in a pre-recording or emboss manner so that a user cannot be rewrite the information, and a copy of the identification information B cannot be changed on the information recording medium by a recording/reproducing apparatus, thereby making it possible to prevent illegal use of the identification information B. In an additional description type information recording medium or rewritable information recording medium, the identification information B is pre-recorded or emboss recorded in a specific area so that the identification information cannot be changed.

7 Claims, 17 Drawing Sheets

FIG. 2A

Buffer area

Border-out

Border-in

FIG. 2B

Border-out    Border-in

FIG. 2C

| Unit position | Contents |
|---|---|
| | |
| | |
| | |
| | |
| | Disk information 3 |
| | |

Border-out {
Border-in {

FIG. 2D

| Disk physical information |
| Disk manufacturer information |
| |

Border zone in data area

| Unit position | Contents |
|---|---|
| | |
| | |
| | |
| | Disk information 4 |
| | |

Border-out
Border-in

Disk information 5

FIG. 6A
Buffer area
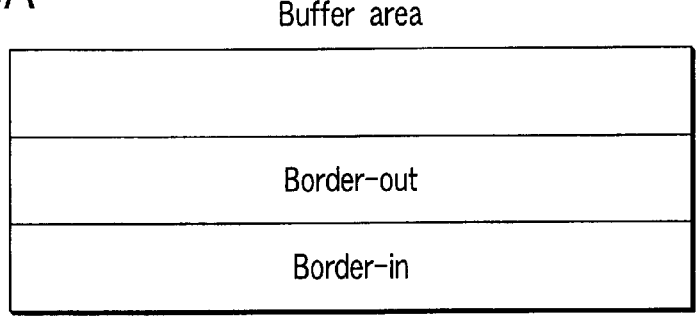
Border-out
Border-in
FIG. 6B
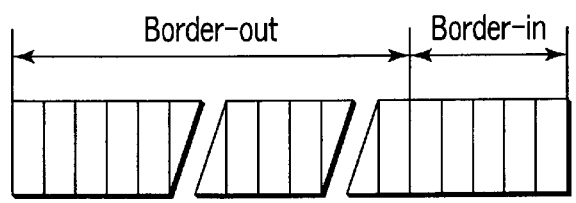
Border-out    Border-in
FIG. 6C
| Unit position | Contents |
|---|---|
| Border-out { | |
| | |
| | |
| Border-in { | Disk information 6 |
| | |
FIG. 6D
| Disk physical information |
|---|
| Disk manufacturer information |
| All 00h |

Border zone in data area

FIG. 9A
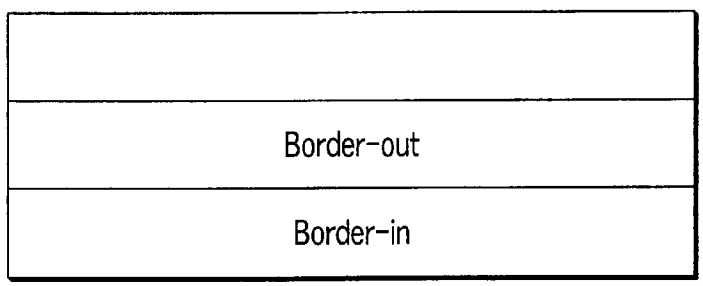
FIG. 9B
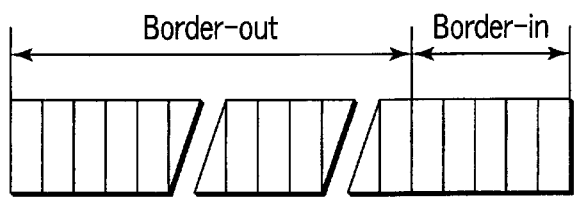
FIG. 9C
| Unit position | Contents |
|---|---|
| Border-out | |
| | |
| | |
| Border-in | Disk information 3A |
| | |
FIG. 9D
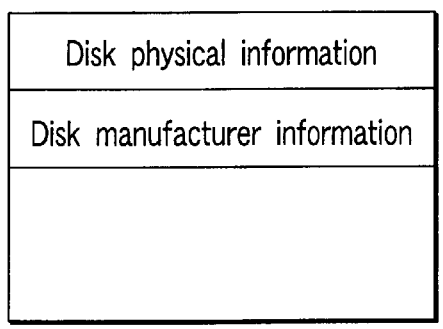

Border zone in data area

| Unit position | Contents |
|---|---|
| | |
| | |
| | |
| | Disk information 4A |
| | |

Border-out { (top three rows)

Border-in { (bottom two rows)

Disk information 5A

Buffer area

Border-out

Border-in

| Unit position | | Contents |
|---|---|---|
| Border-out | | |
| | | |
| | | |
| Border-in | | Disk information 6A |
| | | |

| Disk physical information |
|---|
| Disk manufacturer information |
| All 00h |

FIG. 13A

Border zone in data area

| Current border-out | Next border-in |

FIG. 13B

| Unit position | Contents |
|---|---|
| | |
| | |
| | |
| | Disk information 7A |
| | |

Border-out: top three rows
Border-in: bottom two rows

FIG. 13C

| Disk physical information |
| Disk manufacturer information |
| All 00h |

When an illegal copy is made

When reproduction is carried out

INFORMATION RECORDING MEDIUM AND RECORDING/REPRODUCING APPARATUS COMPATIBLE WITH COPY PROTECTION

CROSS-REFERENCE TO RELATED APPLICATIONS

This is a Continuation Application of PCT Application No. PCT/JP00/02153, filed Apr. 3, 2000, which was not published under PCT Article 21(2) in English.

BACKGROUND OF THE INVENTION

1. Field of the Invention

The present invention pertains to an information recording medium capable of recording and reproducing information and a recording/reproducing apparatus therefor.

2. Description of the Related Art

More particularly, the present invention relates to a physical format of an information recording medium and a recording/reproducing apparatus compatible with copy protection.

A DVD (digital versatile disk) capable of recording/reproducing operation has been developed. These disks each include recordable DVD (hereinafter, referred to as a DVD-R) and re-recordable DVD (hereinafter, referred to as a DVD-RW). These information recording media each are capable of recording a large amount of video data, audio data, and computer data. Thus, it is discussed that media identification information for protecting illegal copy is recorded in advance in these information recording media.

A book type identification code and group wobble detection that are recorded in these media are available for use in identification between DVD-ROM and DVD-R and identification between DVD-ROM and DVD-RW. In addition to these items of identification information, it is discussed that still another item of media identification information is utilized for encode key information for encoding and recording contents.

It is discussed that the media identification information is used in combination with two items of identification information, and a recording mode for an information recording medium as well is recorded in a different form. In any case, such identification information must be formed in such a way that the information cannot be rewritten or changed on the information recording media.

When these items of identification information are defined as identification information A and identification information B, the identification information A is recorded as NBCA (Non-Burst Cutting Area) information in a DVD-RW. The identification information B is not defined yet.

In the present invention, the identification information A is obtained as individual identification information on a disk itself, and a disk serial number or the like is recorded by cutting. The identification information B is at least disk license information, for example, information on copy disabling, enabling of one copy, or enabling of two copies.

In a rewritable DVD (DVD-RAM), the identification information A is recorded as BCA (Burst Cutting Area) information. The identification information B can be recorded as emboss information in a specific area.

With respect to a DVD-R disk, the identification information A and the identification information B are not defined yet.

Jpn. Pat. Appln. KOKAI Publication No. 11-86436 describes a judgment system for, when information is reproduced from a digital information recording medium capable of recording operation such as a DVD-RAM, comparing information sampled and read from electronic transparency information with information recorded on a recording medium, thereby judging whether or not such information is original. However, this document fails to mention how this system is specifically achieved on a DVD-R or DVD-RW disk.

Jpn. Pat. Appln. KOKAI Publication No. 11-355711 describes a multiple signal for preventing duplication, it fails to mention the disposition of identification information on the medium.

Jpn. Pat. Appln. KOKAI Publication No. 10-105975 describes BCA (Burst Cutting Area) recording, it fails to mention the other identification information.

Jpn. Pat. Appln. KOKAI Publication No. 10-105974 describes BCA recording, it fails to mention the other identification information.

As has been described above, although the identification information A is recorded as NBCA information in the above DVD-RW, the identification information B is not defined yet. In addition, with respect to the DVD-R disk, the identification information A and the identification information B are not defined yet.

It is an object of the present invention to provide an information recording medium and method and a recording/reproducing apparatus that correspond to copy protection making it possible to use DVD-RW identification information B, DVD-R identification information A, and identification information B.

BRIEF SUMMARY OF THE INVENTION

In an information recording medium of the present invention, the identification information B itself is recorded in a DVD-R and a DVD-RW in emboss so that a user cannot rewrite the information, and a copy of the identification information B cannot be duplicated or changed on the information recording medium by the recording/reproducing apparatus, thereby prevent illegal use of the identification information B. In addition, in an additional description type recording medium such as a DVD-R, the identification information B may be recorded in a pre-recorded manner instead of emboss.

In addition, in the method and apparatus of the present invention, as described above, a specific fixed value (for example, all zeros) is automatically inserted into such another disk management area so that the identification information B emboss- or pre-recorded in a specific area cannot be copied, thereby preventing illegal use of identification information.

BRIEF DESCRIPTION OF THE SEVERAL VIEWS OF THE DRAWING

FIGS. 2A to 2D are illustrative views each illustrating a data structure of a buffer area shown in FIG. 1;

FIGS. 6A to 6D are views each showing another example of a data structure of a buffer area according to the present invention;

FIGS. 9A to 9D are illustrative views each illustrating a data structure of a buffer area shown in FIG. 8;

FIGS. 13A to 13C are illustrative views illustrating the other example of a data structure of a border zone formed in a data area according to the present invention;

DETAILED DESCRIPTION OF THE INVENTION

Hereinafter, preferred embodiments of the present invention will be described with reference to the accompanying drawings.

Figure 1:
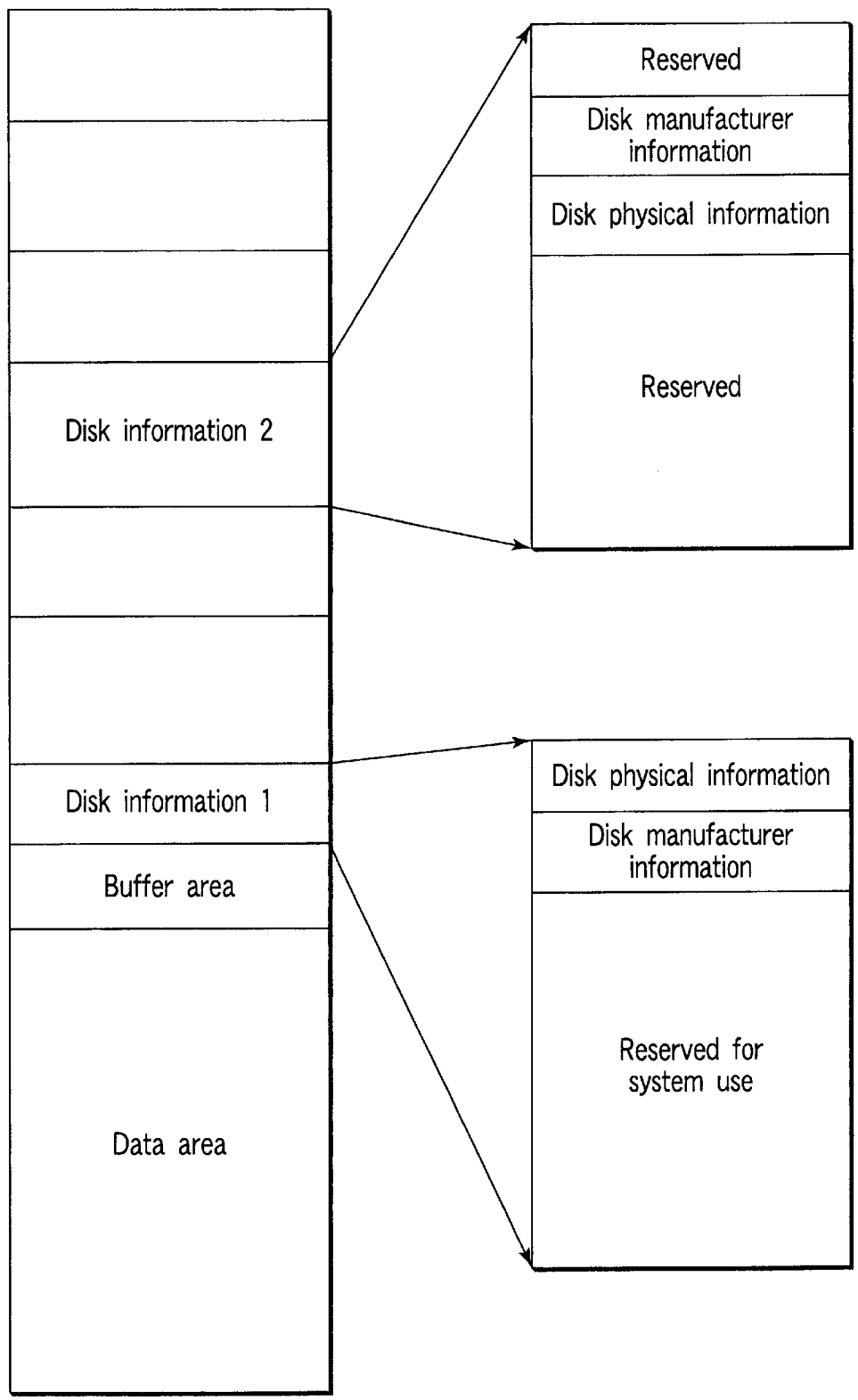
FIG. 1 is an illustrative view illustrating a lead-in data structure of a DVD-R according to the present invention.

FIG. 1 shows a data structure of a lead-in area of an information recording medium (for example, DVD-R) according to the present invention. As shown in FIG. 1, the lead-in area includes one an area for disk information 1 and an area for disk information 2. A buffer area is allocated after the area for disk information 1. A blanked area that is a lead-in area, the blanked area having nothing described therein, records information required for disk management (such as initial value or reference code) or is allocated for reservation or buffer area.

A reserved area, a disk manufacturer information area, an area for disk physical information (including a last address), and a reserved area are allocated in the area for disk information 2.

In addition, an area for disk manufacturer information (the contents of which are identical to those of disk information 1), an area for disk physical information (including a last address), and a reserved area for system use are allocated in an area for the disk information 1.

In the present invention, in the reserved area for system use, information is recorded in a pre-recording or emboss manner for copy protection.

FIG. 2 shows the contents of a buffer area 2. This buffer area has a border-out area and a border-in area, as shown in FIG. 2A.

The border-out area and border-in area are described in units of ECC blocks, as shown in FIG. 2B. These areas each include the sector address of the current border-out area or next border-in area. As shown in FIG. 2C, in particular, in the border-in area, an area for disk information 3 is further allocated. In this area, information on the contents similar to those of disk information 1 can be recorded.

FIG. 3 shows a configuration of a border zone written in a data area when data is additionally described and recorded.

Figures 3A, 3B:
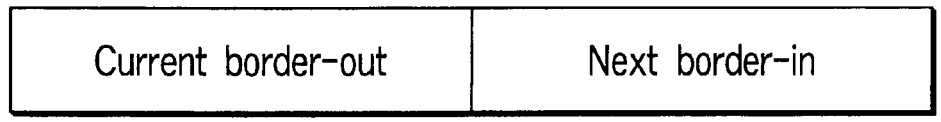
FIGS. 3A and 3B are illustrative views each illustrating a data structure of a border zone formed in a data area shown in FIG. 1.

The configuration of the border area utilized for additional description of data consists of a border-out area and a border-in area, as shown in FIG. 3A. In the border-in area, the contents of updated disk information 4 as shown in FIG. 3B (the format of which is identical to the contents shown in FIG. 2 (disk information 1)) are recorded at the additionally described last section.

Here, the information caused by emboss or pre-recording is formed in a reserved area for use of disk information 1 by a user, and thus, the contents of the recorded data itself cannot be rewritten or changed. Therefore, recording the identification information B in a reserved area for this area in emboss or pre-recording manner satisfies requirements that rewriting or change of data required for the identification information B is impossible. In addition, if the identification information B is recorded in an area for disk information 1, the information can be formed in an emboss or pre-recording manner one time during disk manufacture, which is convenient in disk manufacture.

As described above, even if the identification information B is recorded as disk information B in a pre-recording or emboss manner, the contents of the identification information B itself in a specific area cannot be written into the specific area or the contents of the information cannot be changed. Therefore, when this disk is used or when the contents of this disk are disabled from copy, copy disable information is written into the identification information B itself, thereby making it possible to achieve that purpose. Namely, in this case, in a recording/reproducing apparatus, when an attempt is made to reproduce this DVD-R and copy it in another disk, the recording/reproducing apparatus judges copy disable from the contents of the identification information B.

Now, still another aspect of the present invention will be described here.

In a recording/reproducing apparatus, when identification information B is recorded in an area for disk information 1, this disk information 1 is copied as the contents updated in an area for disk information 2 such another disk management area, disk information 3 and an area for disk information 4. When the information is updated, the disk information B is basically recorded as is in a reserved area, and is additionally described in an area for disk physical information in the form of the current border-out address and the next border-in address.

Information can be recorded later in any of these disk information area and border area by a drive, thus making it possible to record the identification information B in either one of these areas that are disk management information areas while the identification information B is intentionally changed or modified. This is problematic from an aspect of security of the identification information B.

Figure 4:
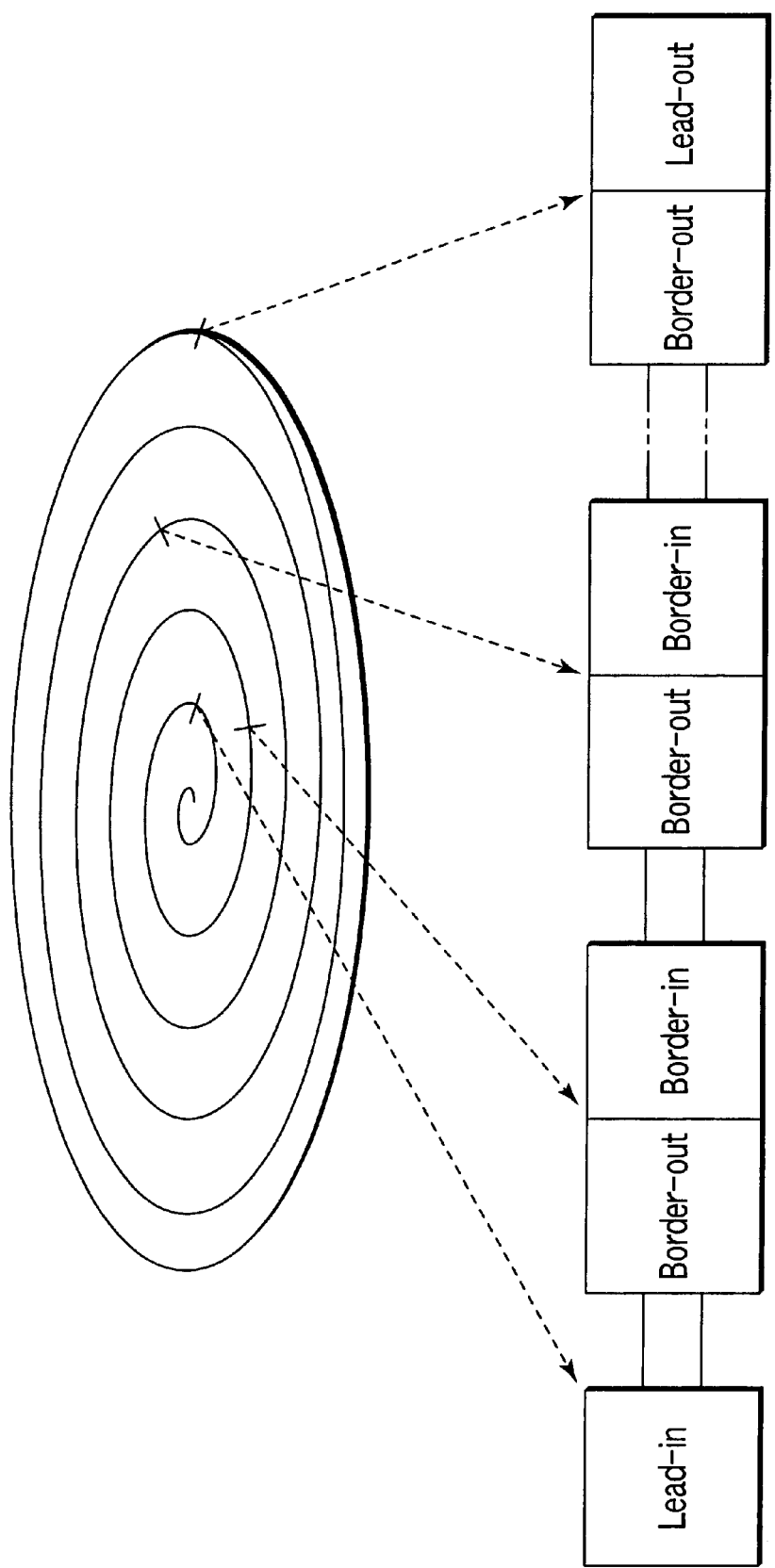
FIG. 4 is an illustrative view illustrating a relationship between a disk and a lead-in and border zone.

Namely, as shown in FIG. 4, if disk information 1 (identification information B) recorded in a lead-in area can be recorded to be intentionally changed or modified in an area for disk information 2 or area for a buffer area (in lead-in), or in a border-in area included in a data area, there is a possibility that the contents of this disk can be copied in still another disk. This is because the identification information B is obtained as at least disk license information for identification information, as described previously, and is obtained as information on copy disabling, enabling of one copy, or enabling of two copies, for example.

If the identification information B is modified as is, the contents of the disk information 1 is ignored, and system administration is carried out based on other items of disk information 2, 3, and 4, thereby enabling further copy to a next disk.

Next, in the present invention, identification information B is formed in an area for disk information 1 in an emboss or pre-recording manner, thereby preventing change or rewriting in this area, and further, disabling the identification information B from being modified and recorded in areas for disk information 2 or disk information 3 and 4.

Figure 5:
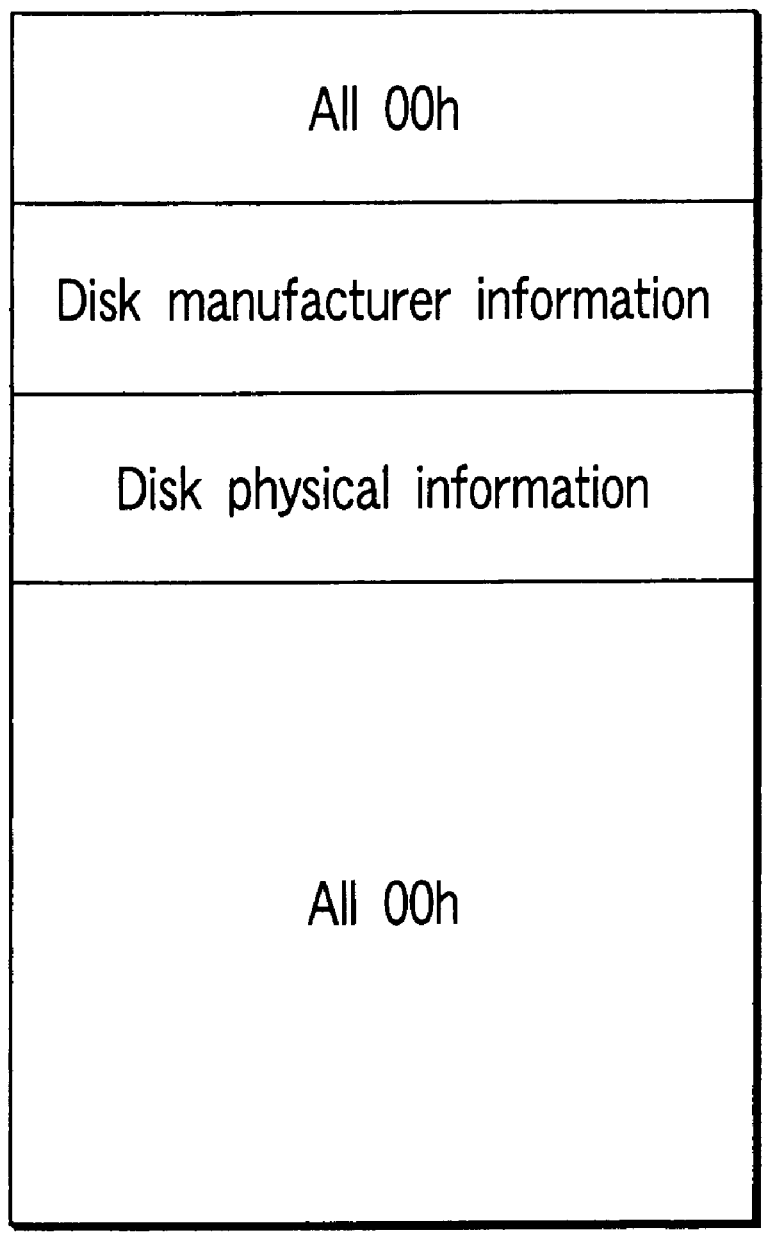
FIG. 5 is an illustrative view illustrating another example of data contents of disk information according to the present invention.

Because of this, for example, a reserved area is included in an area for disk information 2 shown in FIG. 1 described previously. As shown in FIG. 5, a reserved area is recorded as a fixed value such as A11 00h.

In addition, disk information 3 at a border-in unit position shown in FIG. 2 described previously is defined as disk information 6 as shown in FIG. 6, and a specific fixed value such as A11 00h is recorded in a reserved area.

FIG. 6 shows the contents of a buffer area 2. As shown in FIG. 6A, this buffer area includes a border-out area and a border-in area. The border-out area and border-in area are described in units of ECC blocks, as shown in FIG. 6B. These areas each include the sector address of the current border-out area or next border-in area. As shown in FIGS. 6C and 6D, an area for disk information 6 is allocated in the border-in area in particular.

Figure 7A:
FIGS. 7A to 7C are illustrative views each showing another example of a data structure of a border zone formed in a data area according to the present invention.
Figure 7B:
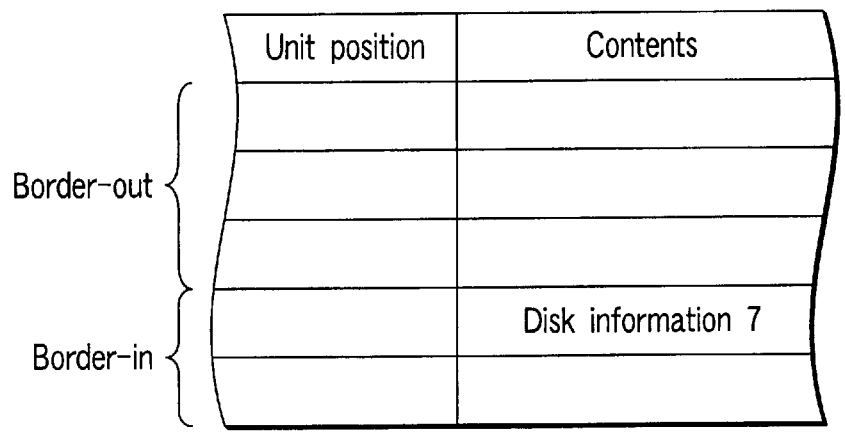
Figure 7C:
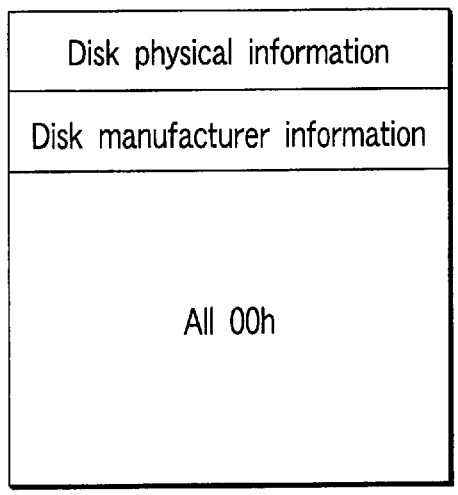

Furthermore, in a border zone included in a data area as well, as shown in FIG. 7, disk information to be described in a border-in is obtained as disk information 7, and a specific fixed value such as a reserved area A11 00h is recorded. FIG. 7A shows a border-out or border-in arrangement, and FIG. 7B shows unit positions of the border-out and border-in and the contents thereof. FIG. 7C shows the contents of disk information recorded in the border-in.

As a result, the identification information B is recorded only in a emboss or pre-recorded area (disk information 1), and the copy or modification contents of the identification information B are not recorded in another area capable of being recorded.

Namely, in the present invention, as described above, disk information 5, 6, and 7 are recorded as shown in FIGS. 5, 6, and 7 as disk information on a position that corresponds to disk information 2 or 3 and a position that corresponds to border-in disk information 4. As a result, all the positions corresponding to disk information 2, 3, and 4 are obtained as fixed values, and thus, the identification information B recorded as disk information 1 cannot be copied or recorded to be modified at a position capable of being recorded. Therefore, even if an attempt is made to record the information having identification information B recorded therein in still another disk or even if an attempt is made to judge border-in identification information and make a copy to another disk, the contents of identification information is obtained as a fixed value. Thus, the judgment result is obtained as an error, and duplication cannot be made.

The present invention is not limited to the above described embodiments. The foregoing description has given type of DVD-R and its copy protect recording. However, the present invention is applicable to DVD-RW as well similarly.

Figure 8:
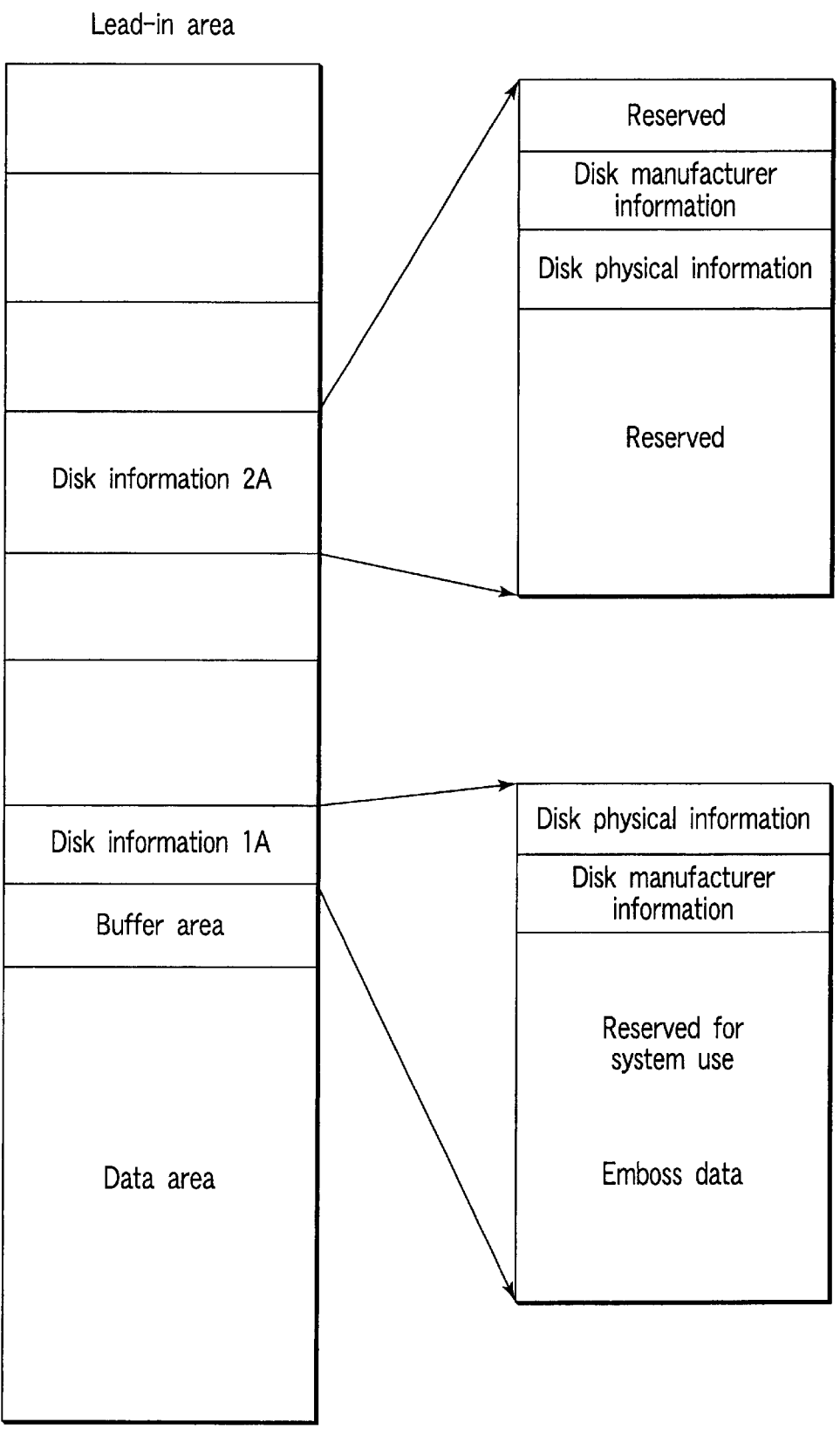
FIG. 8 is an illustrative view illustrating a data structure of lead-in of DVD-RW according to the present invention.

In DVD-RW, as shown in FIG. 8, a disk lead-in area has an area for disk information 1A and an area for disk information 2A. A reserved area, an area for disk manufacturer information, an area for disk physical information, and a reserved area are allocated in an area for disk information 2A.

In addition, when information has been recorded in an area for disk information 1A in an unreadable emboss, manufacturer information are recorded as the contents of disk. In this case, this portion cannot be practically reproduced, and data cannot be recorded in this portion.

However, in the present invention, this area is readable, information is readable, and the information is recorded in an emboss manner in order to obtain copy protection. Because of this, reserved areas for disk physical information, disk manufacturer information, and system use is further provided.

In addition, although a buffer area is provided next to this disk information 1A, border-out and border-in areas as shown in FIG. 9 are allocated in this area. In the border-in area, an area for recording disk information 3A is allocated.

FIG. 9 shows the contents of a buffer area. This buffer area has a border-out area and a border-in area, as shown in FIG. 9A. The border-out area and border-in area are described in units of ECC blocks, as shown in FIG. 9B, wherein the sector address of the current border-out area or next border-in area is included. As shown in FIG. 9C, an area for disk information 3A is further allocated in the border-in area in particular. The information whose contents are similar to those of disk information 1A can be recorded in this area.

FIG. 10 shows a configuration of a border zone written in a data area, when data is additionally described or recorded.

Figures 10A, 10B:
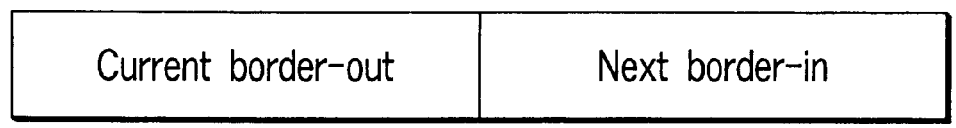
FIGS. 10A and 10B are illustrative views each illustrating a data structure of a border zone formed in a data area shown in FIG. 8.

A configuration of the border area utilized for additional description of data consists of a border-out area and a border-in area, as shown in FIG. 10A. In the border-in area, the contents of updated disk information 4A as shown in FIG. 10B (the format of which is identical to the contents shown in FIG. 8 (disk information 1A)) are recorded at the recorded last section.

Here, information is formed in a reserved area for use of disk information 1A by the user in an emboss recording manner, and rewriting or change of the contents of the recorded data itself cannot be carried out. Therefore, recording identification information B in a reserved area for this area in an emboss manner satisfies the requirement that rewriting or change of the data required for identification information B cannot be carried out. In addition, if the identification information B is recorded in an area for disk information 1A, such information can be formed in an emboss or pre-recording manner one time during disk manufacture, which is convenient in disk manufacture.

As has been described above, identification information is defined as disk information B, and is recorded in an emboss manner, whereby the contents of the identification information B itself in a specific area cannot be rewritten or the contents of the information cannot be changed. Therefore, when this disk is used or when the contents of this disk is disabled from copy, copy disable information is written in the identification information B itself, thereby making it possible to achieve that purpose. Namely, in this case, in a recording/reproducing apparatus, when an attempt is made to reproduce this DVD-RW and copy it in another disk, the recording/reproducing apparatus judges copy disable from the contents of the identification information B.

Now, still another aspect of the present invention will be described here.

In a recording/reproducing apparatus, when identification information B is recorded in an area for disk information 1, this disk information 1A is copied as the contents updated in an area for disk information 2A that is another disk management area, an area for disk information 3A, and an area for disk information 4A in a data area. When the information is updated, the disk information B is basically recorded as is in a reserved area, and is additionally described in an area for disk physical information in the form of the current border-out address and the next border-in address.

Information can be recorded later in any of these disk information area and border area by a drive, thus making it possible to record the identification information B in either one of these areas that are disk management information areas while the identification information B is intentionally changed or modified. This is problematic from an aspect of security of the identification information B.

Namely, as shown in FIG. 4, if disk information 1 (identification information B) recorded in a lead-in area can be recorded to be intentionally changed or modified in an area for disk information 2 or area for a buffer area (in lead-in), or in a border-in area included in a data area, there is a possibility that the contents of this disk can be copied in still another disk. This is because the identification information B is obtained as at least disk license information for identification information, as described previously, and is obtained as information on copy disabling, enabling of one copy, or enabling of two copies, for example.

If the identification information B is modified as is, the contents of the disk information 1 is ignored, and system administration is carried out based on other items of disk information 2, 3, and 4, thereby enabling further copy to a next disk.

Next, in the present invention, identification information B is formed in an area for disk information 1A in an emboss or pre-recording manner, thereby preventing change or rewriting in this area, and further, disabling the identification information B from being modified and recorded in areas for disk information 2A or disk information 3A and 4A.

Figure 11:
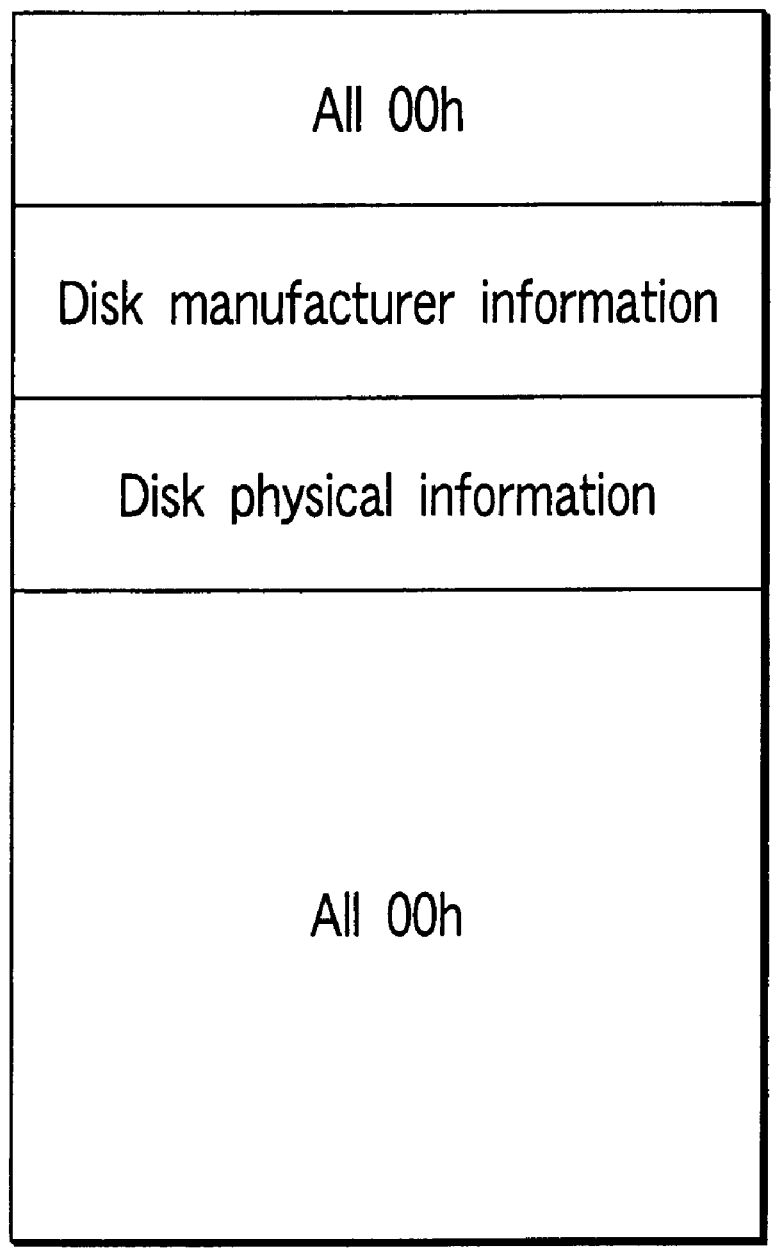
FIG. 11 is an illustrative view illustrating the other example of data contents of disk information according to the present invention.

Because of this, for example, a reserved area is included in an area for disk information 2 shown in FIG. 8 described previously. As shown in FIG. 11, a reserved area is recorded as a fixed value such as A11 00h.

In addition, disk information 3A at a border-in unit position shown in FIG. 9 described previously is defined as disk information 6 as shown in FIG. 12, and a specific fixed value such as A11 00h is recorded in a reserved area.

Figures 12A, 12B, 12C, 12D:
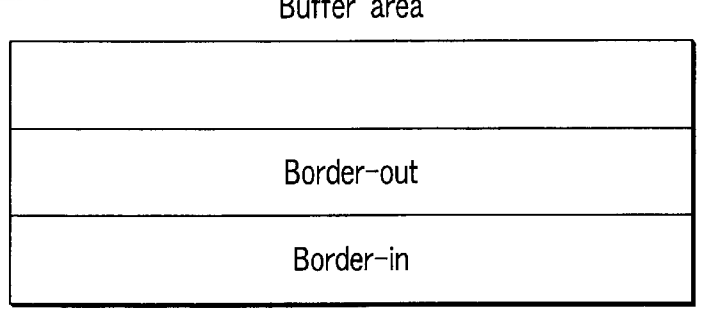
FIGS. 12A to 12D are illustrative views each illustrating the other example of a data structure of a buffer area according to the present invention.

FIG. 12 shows the contents of a buffer area 2. As shown in FIG. 12A, this buffer area has a border-out area and a border-in area. The border-out area and border-in area are described in units of ECC blocks, as shown in FIG. 12B. These areas each include the sector address of the current border-out area or next border-in area. As shown in FIGS. 12C and 12D, an area for disk information 6 is allocated in the border-in area in particular.

Furthermore, in a border zone included in a data area as well, as shown in FIG. 13, disk information to be described in a border-in is obtained as disk information 7, and a specific fixed value such as a reserved area A11 00h is recorded. FIG. 13A shows a border-out or border-in arrangement, and FIG. 13B shows unit positions of the border-out and border-in and the contents thereof. FIG. 13C shows the contents of disk information recorded in the border-in.

As a result, the identification information B is recorded only in a emboss recorded area (disk information 1A), and the copy or modification contents of the identification information B are not recorded in another area capable of being recorded.

Namely, in the present invention, as described above, disk information 5A, 6A, and 7A are recorded as shown in FIGS. 5, 6, and 7 as disk information on a position that corresponds to disk information 2A or 3A and a position that corresponds to border-in disk information 4. As a result, all the positions corresponding to disk information 2A, 3A, and 4A are obtained as fixed values, and thus, the identification information B recorded as disk information 1A cannot be copied or recorded to be modified at a position capable of being recorded. Therefore, even if an attempt is made to record the information having identification information B recorded therein in still another disk or even if an attempt is made to judge border-in identification information and make a copy to another disk, the contents of identification information is obtained as a fixed value. Thus, the judgment result is obtained as an error, and duplication cannot be made.

The present invention is not limited to the above described embodiments.

As shown in FIG. 8, although a disk manufacturer information area, a disk physical information area, and a reserved area are allocated for disk information 1A and 2A, these two items of information is the same as each other with an only difference in arrangement of disk manufacturer information and disk physical information.

After the identification information B contained in disk information 2A has been replaced with a fixed value (A11 00h), additional description or rewriting may be carried out by reusing a disk. When a border zone is created at the last of write data, the contents of disk information 2A may be written at the last of write data. By doing this also, the identification information B contained in border-in disk information is obtained as a fixed value (A11 00h), advantageous effect similar to that of the previously described embodiment can be attained.

Now, a disk drive unit or a recording/reproducing apparatus capable of recording/reproducing operation that is compatible with DVD-R or DVD-RW will be described here.

Figure 14:
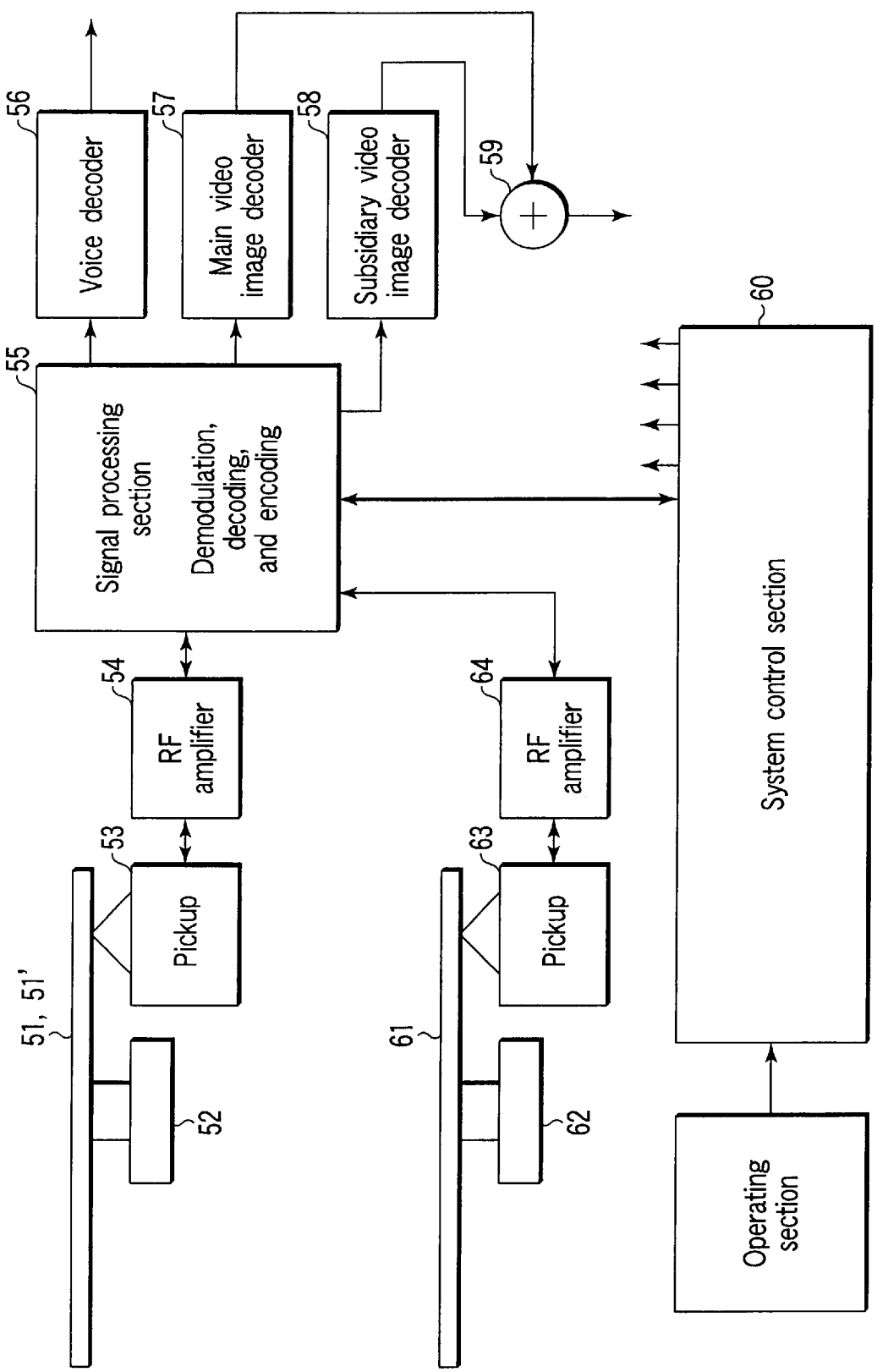
FIG. 14 is a view showing a configuration of a recording/reproducing apparatus for an information recording medium according to the present invention.

FIG. 14 shows a schematic configuration of a recording/reproducing apparatus. A first disk 51 is rotated by a disk motor 51. First, a flow of operation of reproduction mode will be described here. When information contained in the disk 51 is read out, the information is optically read by laser emitted from a pickup 53. The laser emitted from the pickup 53 is reflected from the disk 51, and the thus reflected light is converted into an electrical signal by a photoelectric converter element. This high frequency signal is inputted to, and is amplified by a high frequency amplifier 54, and then, the amplified signal is inputted to a signal processing section 55. The signal processing section 55 carries out two-valued processing, error correction processing, and modulation and demodulation processing or the like. The signal processing section 55 comprises reproduction signal processing means and recording signal processing means.

Demodulated voice information is inputted to a voice decoder 56, and is decoded. The thus decoded voice signal is supplied to a voice amplifier. In addition, demodulated main video information is decoded by a main video decoder 57. In addition, subsidiary video information obtained by encoding information such as cinema superimposition is decoded by a subsidiary video decoder 58. The main video image and subsidiary video image are composed by a composer 59, and is supplied to a display.

In addition, various items of management information decoded by the signal processing section 55 are inputted to a system control section 60, and the inputted various items of information are analyzed. The analyzed items of information are obtained as disk type or as judgment information for reproduction or recording.

Reference numeral 61 denotes a second disk utilized as a buffer, for example. This disk 61 is equal to a hard disk incorporated in the recording/reproducing apparatus, for example. This applies to reproduction of recording information on the disk 61. A first disk 61 is rotated by a disk motor 61. When information contained in the disk 61 is read out, the information is optically read by laser emitted from a pickup 63. The laser emitted from the pickup 61 is reflected from the disk 61, and the thus reflected light is converted into an electrical signal by a photoelectric converter element. This high frequency signal is inputted to, and is amplified by a high frequency amplifier 64, and then, the amplified signal is inputted to a signal processing section 55. The signal processing section 55 carries out two-valued processing of a high frequency signal or demodulation processing or the like.

Now, a flow of operation of recording mode will be described here.

For example, when information temporarily buffered in a second disk 61 is recorded in a second disk 51, a recording mode is set, and information contained in a second disk 61 is reproduced. Then, the reproduced information is read by a signal processing section 55, and for example, $8/16$ or $8/15$ modulation processing is applied. Then, the thus modulated signal is amplified, and is used as a laser diode drive signal of a pickup 53. In this manner, information contained in the disk 61 is recorded in the disk 51.

Conversely, in the case the information contained in the disk 51 is temporarily stored in the disk 61, the information contained in the disk 51 is reproduced. The reproduced information is read by the signal processing section 55, and for example, $8/16$ or $8/15$ modulation processing is applied. Then, the thus modulated signal is amplified, and the amplified signal is used as a drive signal of a laser diode of the pickup 63.

Figure 15:
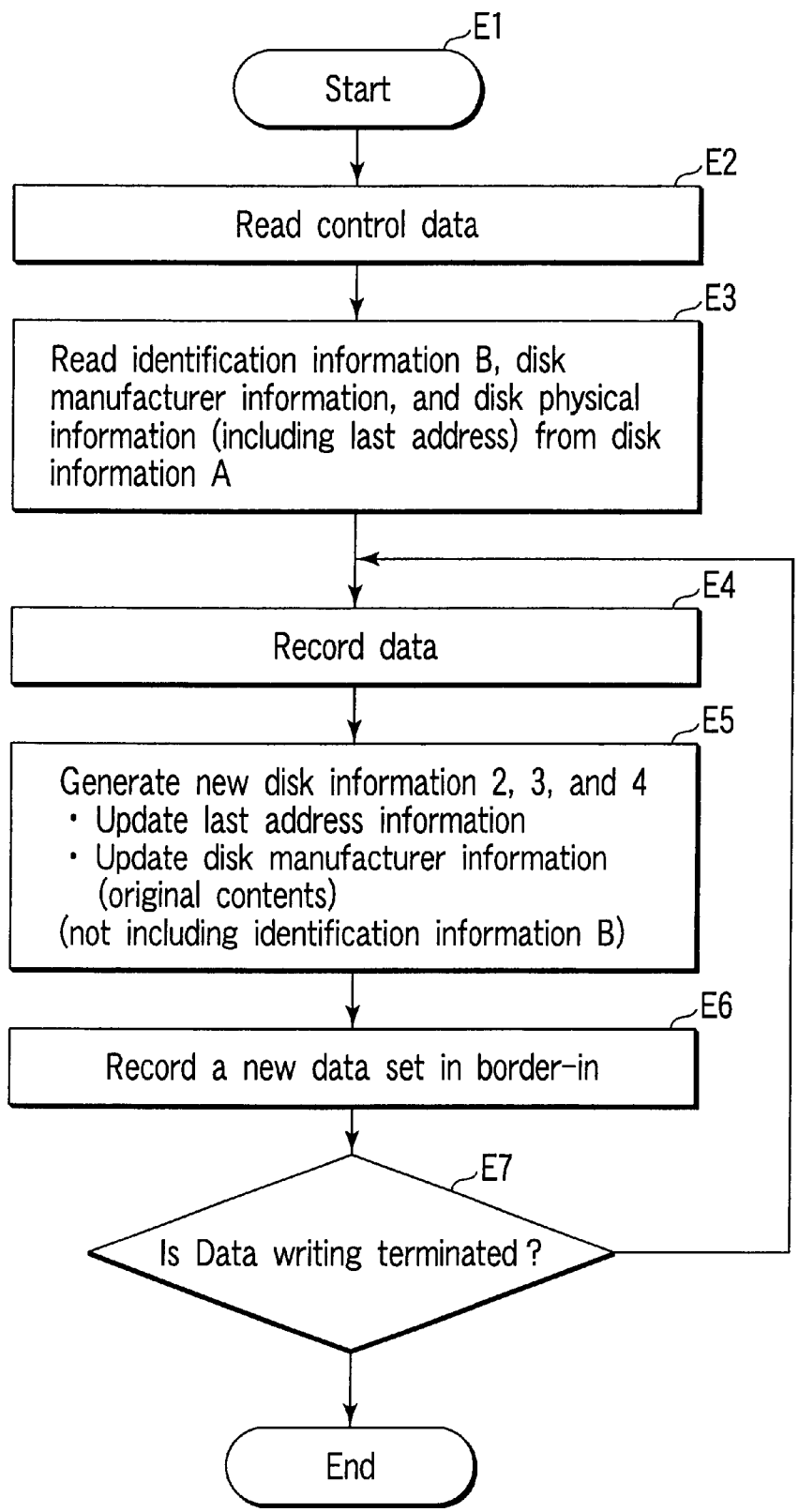
FIG. 15 is an illustrative view illustrating an exemplary operation of the apparatus shown in FIG. 14 similarly.
Figure 16:
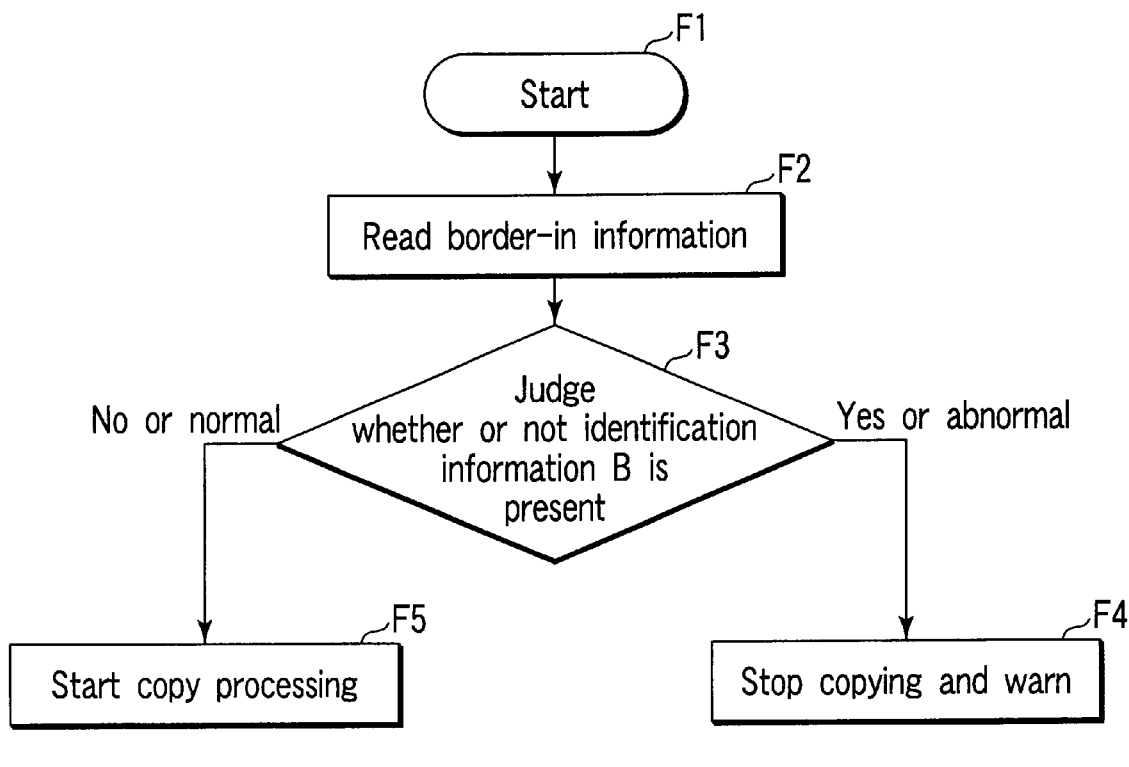
FIG. 16 is an illustrative view showing an exemplary operation of the apparatus shown in FIG. 14 similarly.

FIG. 15 is a flowchart illustrating one of the essential parts of the present invention. A function governing this operation is set as a program of a system control section 60.

Now, assume that information contained in the second disk 61 is recorded in the first disk (for example, DVD-RW) according to the present invention.

Assume that original data is recorded as is in the second disk 61. When recording is started, control data (disk information 1A) is first read from the first disk 51. Identification information B, disk manufacturer information, and disk physical information are recorded in disk information 1A, and the system control section 60 can judge whether or not first disk type is present or one copy is enabled from this content. In addition, key information for encoding contents recorded in a data area can be generated by using the identification information B (during reproduction, key information for decompressing the encoding contents can be generated). The thus generated key information is delivered to the signal processing section 55, and is utilized for encoding non-encoded contents or is utilized to be decompressed to the non-encoded contents (steps E1, E2, and E3).

If identification information B indicates enabling of one copy in a recording mode, data recorded in the disk 61 is written. If a command for terminating reading of data contained in the disk 61 or a stop command is issued, new disk information 5A, 6A, and 7A or the like described previously are generated. In addition, last address information is generated in response to a last position of a recording position, and the original last address is updated (step E5). Next, new disk information is recorded at a predetermined border-in position (step E6).

At this time, as shown in disk information 5A, 6A, and 7A, identification information B is rewritten into a fixed value such as all zeros, and is recorded.

Identification information B is recorded in the second disk 61 as well. Thus, by using the identification information B, the system control section 60 can generate key information when the information contained in the second disk 61 is reproduced, and can decompress the encoded contents (provided if the contents recorded in the disk 61 is encoded).

Next, assume that the first disk 51 (for example, DVD-RW) having data recorded in the above described system is used for reproduction. In this case, data is reproduced in the previously described reproduction system.

Now, assume that the contents of the first disk 51 having data recorded in the above described system are temporarily stored in the second disk 61. Then, assume that an attempt is made to copy the contents of the disk 61 in a first new disk 51'. In this case, the border-in identification information B is recorded as shown in disk information 5A, 6A, and 7A. As a result, even if the disk 61 has been reproduced, the border-in identification information B is set to a fixed value. Thus, the system control section 60 judges that a disk coincides with a physical format of the present invention, and proceeds to next copy processing (step F1, F2, F3, and F5).

Next, when original identification information B is stored in border-in of the second disk 61, namely, when formal identification information B exists at a position that corresponds to disk information 3, 4, and 5, it is judged that a disk does not coincide with the physical format according to the present invention (step F3). Then, copy processing is stopped or warned (step F4).

The present invention is not limited to the above described embodiment.

When information is recorded in a DVD-R or DVD-RW disk by an information recording/reproducing apparatus capable of recording operation, the apparatus being compatible with DVD-R or DVD-RW, information contained in disk information 1 is reproduced, and the presence of identification information B is checked. If the identification information B does not exist, data is recorded in a disk that does not support the identification information B. In addition, in the disk that does not support the identification information B, all the data contained in identification information B recorded in another area capable of being recorded (disk information 5, 6, and 7 or 5A, 6B, and 7C) become 00h.

When identification information B exists, the data contained in identification information B is maintained in a memory, and is used as key information for encoding data when user data is recorded.

Although the data contained in identification information B is maintained in a memory, the contents of the data is disabled from being recorded in a disk write enable area.

Figure 17:
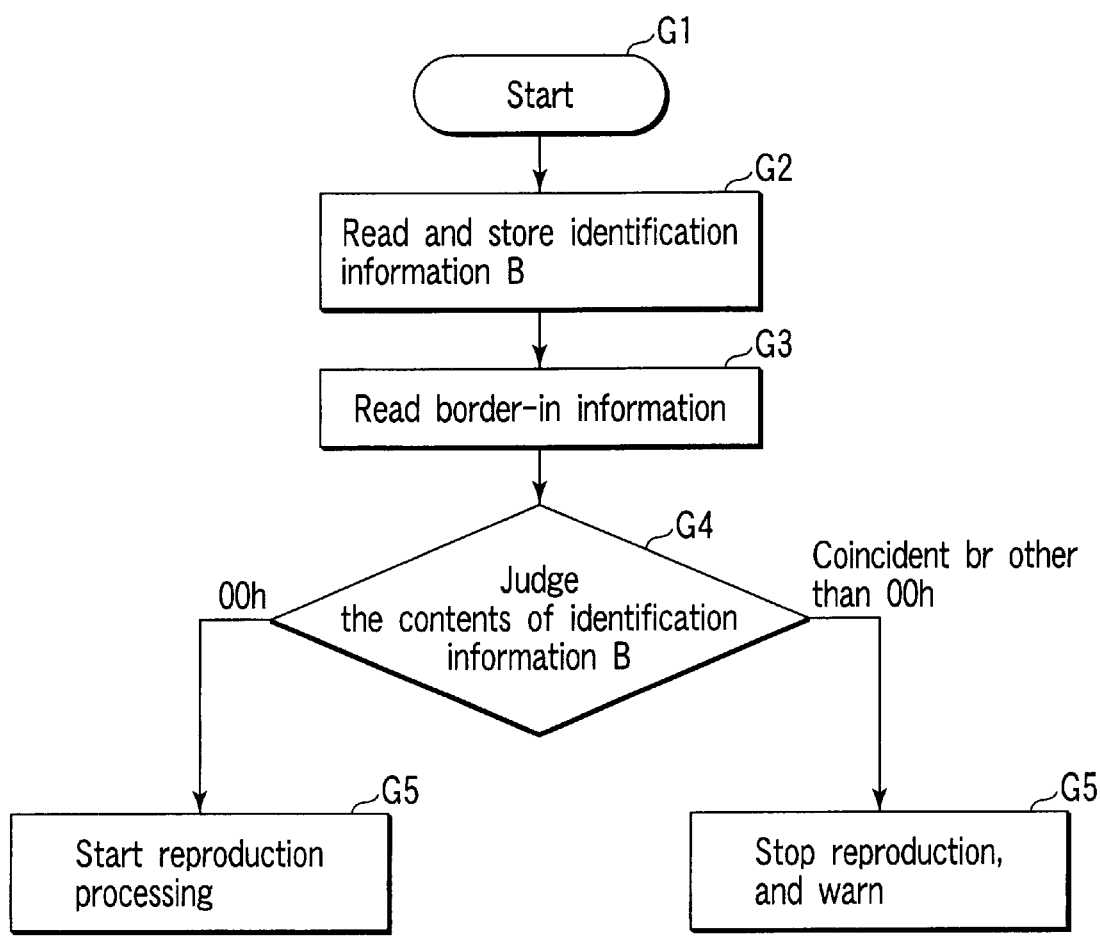
FIG. 17 is an illustrative view illustrating an exemplary operation of the apparatus shown in FIG. 14 similarly.

In FIG. 17, when such a disk is reproduced, the data contained in identification information B reproduced from disk information 1 is maintained in a memory (steps G1, G2, and G3). Then, when data identical to identification information B stored in the memory or data other than all 00h is detected from another area (disk information 5, 6, and 7 or 5A, 6B, and 7C) capable of being recorded, reproduction of such disk is disabled (G4 and G5). Otherwise, reproduction is carried out (G6).

In this manner, illegal use of identification information B pre-recorded or emboss recorded as disk information 1 is prevented, The present invention is not limited to the above described embodiment.

Although a description has been given, assuming that information recorded in a DVD-R or DVD-RW is acquired from a hard disk or another disk, and is recorded therein, the present invention is, of course, applicable to a case where information distributed in a wired or wireless manner is handled.

As has been described above, according to the present invention, identification information B is recorded in a DVD-R and DVD-RW in an emboss manner so that the user cannot rewrite it, and a copy of the identification information B cannot be duplicated or changed on the information recording medium by the user or recording/reproducing apparatus, thereby making it possible to prevent illegal use of the identification information B. In an additional description type recording medium such as DVD-R, identification information B may be recorded in a pre-recording manner instead of emboss.

As has been described above, the present invention is applicable to: a field of an information recording medium useful for achieving copy protection; a field of manufacturing and using this information recording medium; and further, a technical field of an apparatus capable of recording/reproducing operation.

What is claimed is:

1. An information recording/reproducing apparatus comprising:

pickup means capable of emitting laser to an information recording medium, thereby optically reading information recorded in the recording medium, and capable of optically writing information in an area capable of being recorded in the information recording medium;

reproduction signal processing means for processing read information obtained from said pickup in a reproduction mode;

writing signal processing means for supplying a write signal to said pickup in a recording mode; and means for, of management information obtained by said reproduction signal processing means, disabling specific identification information recorded in advance in a specific area of said information recording medium from being written into an area capable of writing the identification information contained in said information recording medium via said writing signal processing means.

2. An information recording/reproducing apparatus as claimed in claim 1, wherein said specific identification information is pre-recorded or emboss recorded.

3. An information recording/reproducing apparatus as claimed in claim 1, wherein said information recording medium is a recordable information recording medium or a rewritable information recording medium.

4. An information recording/reproducing apparatus comprising:

pickup means capable of emitting laser to an information recording medium, thereby optically reading information recorded in the recording medium, and capable of optically writing information in an area capable of being recorded in the information recording medium;

reproduction signal processing means for processing read information obtained from said pickup in a reproduction mode;

writing signal processing means for supplying a write signal to said pickup in a recording mode; and means for, of management information obtained by said reproduction signal processing means, identification information whose contents are identical to those of specific identification information recorded in advance in a specified area of said information recording medium, is detected from another area capable of writing identification information contained in said information recording medium, disabling reproduction of the information recording medium.

5. An information recording/reproducing apparatus as claimed in claim 4, wherein said specific identification information is pre-recorded or emboss recorded.

6. An information recording/reproducing apparatus as claimed in claim 4, wherein said information recording medium is a recordable information recording medium or a rewritable information recording medium.

7. An information recording/reproducing apparatus comprising:

pickup means capable of emitting laser to an information recording medium, thereby optically reading information recorded in the recording medium, and capable of optically writing information in an area capable of being recorded in the information recording medium;

reproduction signal processing means for processing read information obtained from said pickup in a reproduction mode;

writing signal processing means for supplying a write signal to said pickup in a recording mode; and means for, of management information obtained by said reproduction signal processing means, converting identification information recorded in advance in a specific area of said information recording medium into a fixed value, followed by writing the converted value into an area capable of writing identification information contained in said information recording medium via said writing signal processing means.

* * * * *